(No Model.) 2 Sheets—Sheet 1.
G. W. PELLET, Jr.
DUMPING WAGON.
No. 546,341. Patented Sept. 17, 1895.
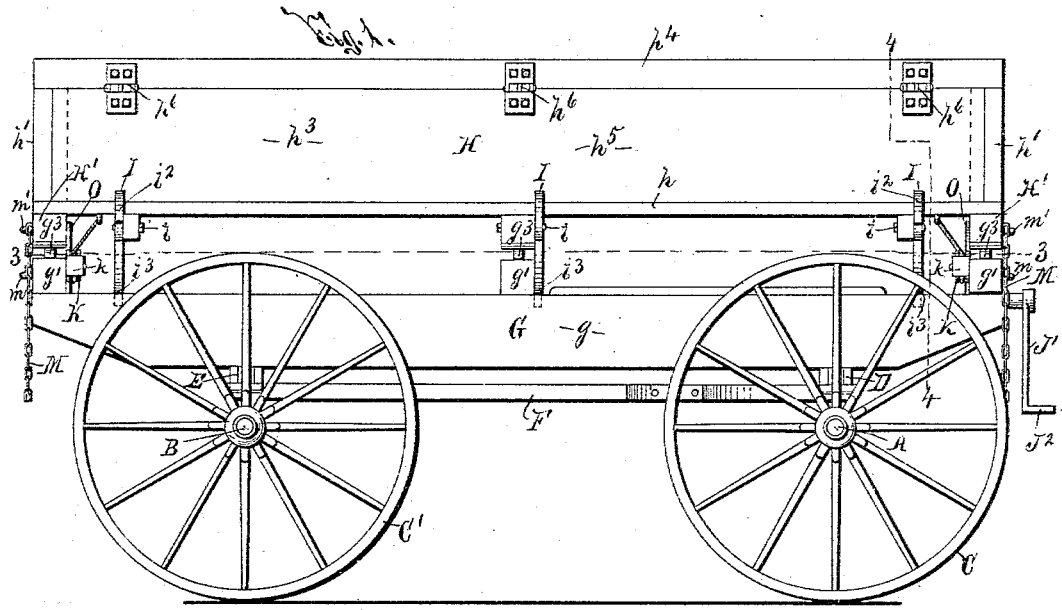
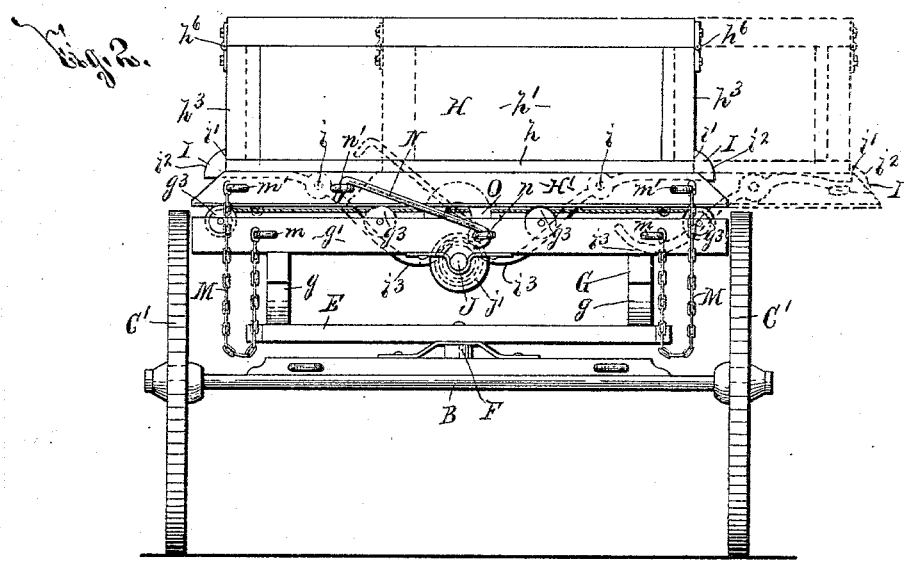
WITNESSES:
H. E. Chase,
L. Schoeneck.
INVENTOR
George W. Pellet Jr.
BY
Hey, Wilkinson & Parsons
ATTORNEYS.

(No Model.) 2 Sheets—Sheet 2.
G. W. PELLET, Jr.
DUMPING WAGON.
No. 546,341. Patented Sept. 17, 1895.
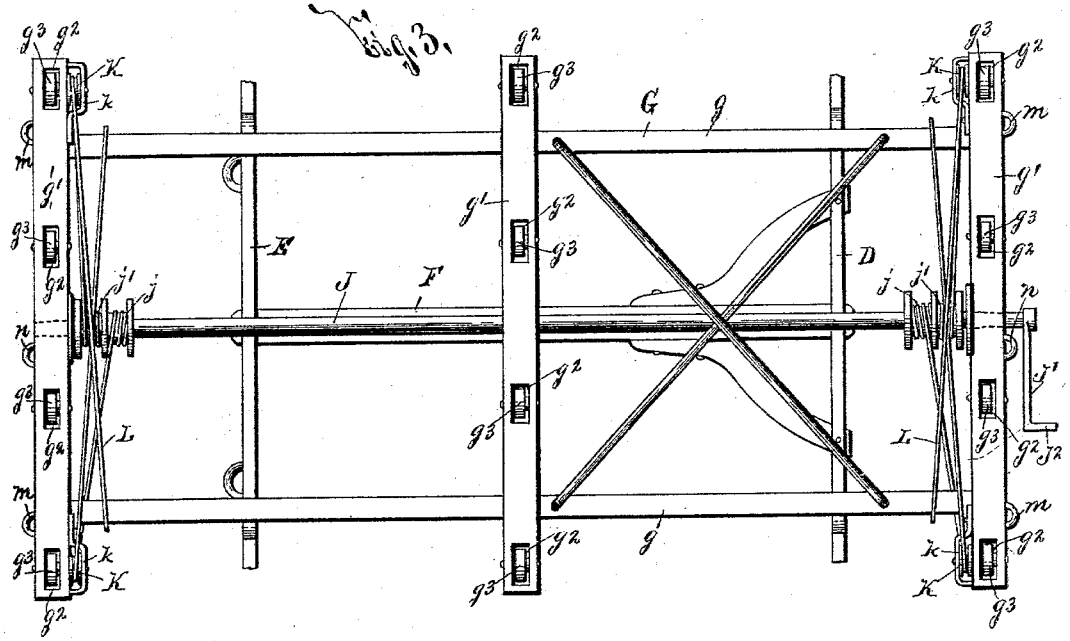
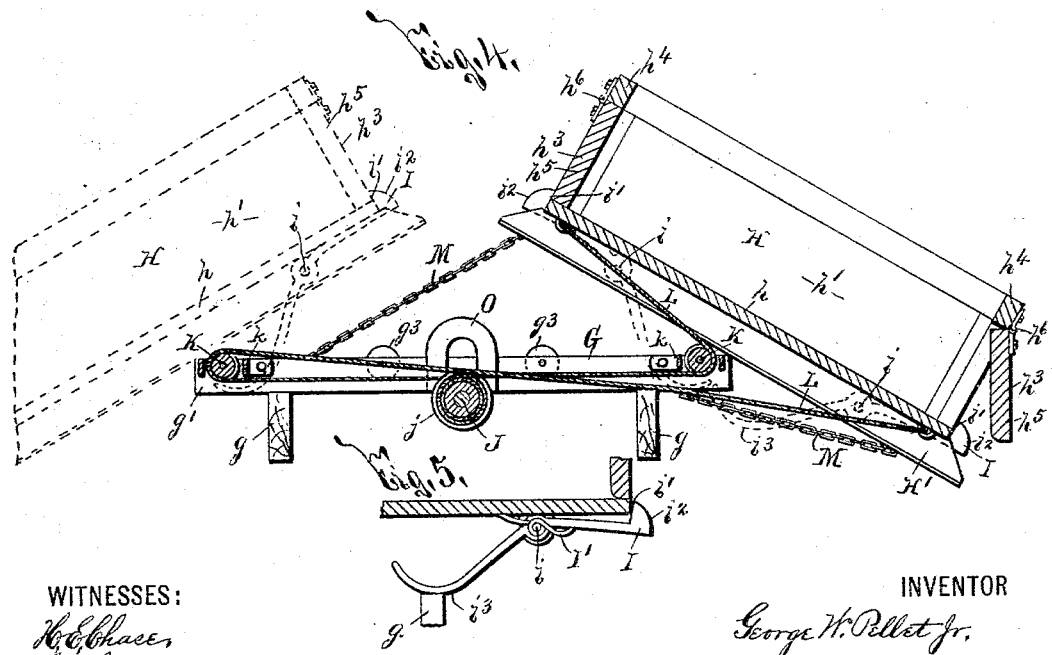
WITNESSES:
INVENTOR
George W. Pellet Jr.
BY Wilkinson & Parsons
ATTORNEYS

UNITED STATES PATENT OFFICE.

GEORGE W. PELLET, JR., OF SYRACUSE, NEW YORK.

DUMPING-WAGON.

SPECIFICATION forming part of Letters Patent No. 546,341, dated September 17, 1895.

Application filed January 13, 1894. Serial No. 496,746. (No model.)

*To all whom it may concern:*

Be it known that I, GEORGE W. PELLET, Jr., of Syracuse, in the county of Onondaga, in the State of New York, have invented new and useful Improvements in Vehicles, of which the following, taken in connection with the accompanying drawings, is a full, clear, and exact description.

My invention relates to improvements in vehicles, and has for its object the production of a simple and practical device for quickly and effectively transporting stone and similar articles which is expeditiously unloaded with a minimum amount of labor and is strong and durable in use; and to this end it consists in the detail construction and arrangement of the parts, all as hereinafter more particularly described, and pointed out in the claims.

In describing this invention, reference is had to the accompanying drawings, forming a part of this specification, in which like letters indicate corresponding parts in all the views.

Figures 1 and 2 are respectively side elevation and rear end views of my improved vehicle, illustrating the general construction and arrangement of its parts. Fig. 3 is a longitudinal horizontal sectional view taken on line 3 3, Fig. 1. Fig. 4 is a transverse vertical sectional view taken on line 4 4, Fig. 1, the box being shown tilted at one side of the running-gear, in its position assumed when discharging its load, and being indicated by dotted lines in a similar position at the opposite side of the running-gear; and Fig. 5 is a detail view illustrating the stop for holding the movable side-wall section of the box in its normal position, said stop or catch being illustrated as in its inoperative position.

My invention has for its object the production of a simple and effective vehicle which can be easily and quickly unloaded, and it is particularly applicable for transporting stone and similar articles, since it reduces to a minimum the labor, time, and inconvenience heretofore necessitated in handling said articles and unloading the vehicle laden therewith.

The running-gear of my improved vehicle may be of any desired form, size, and construction suitable for the designed purpose, and consists, preferably, of axles A B, wheels C C', bolsters D E, reach F, and a supporting-frame G, having its opposite ends arranged between the front and rear wheels and mounted upon and suitably secured to the front and rear bolsters.

The frame G consists, preferably, of longitudinal side bars $g\ g$ and end and intermediate cross-bars $g'\ g'\ g'$. The bars $g'\ g'\ g'$ are provided with sockets $g^2$, and mounted therein are suitable supporting-rollers $g^3$, the upper faces of which project slightly above said cross-bars.

The box H consists of a bottom wall $h$, end walls $h'\ h'$, rising above the bottom and projecting slightly below the same, and longitudinal side walls $h^3\ h^3$. The side walls $h^3$ each consist of a stationary upper section or bar $h^4$ and a movable lower section $h^5$, having its upper edge secured to the upper section of bar $h^4$ by hinges $h^6$, of any desired form, size, and construction. The lower edge of each of the side wall sections $h^5$ is disconnected with the box and is free to swing outwardly.

Suitable stops or catches I engage the lower edges of the side-wall sections $h^5$ and hold the same in their normal position. As preferably constructed, and as best seen in Fig. 5, each of these stops or catches consists of a lever pivoted at $i$ to an ear depending from the bottom of the box H, and provided at its outer end with a shoulder $i'$ and a rounding face $i^2$, and at its other end with a rounding lower face $i^3$. The shoulders $i'$ bear against the outer faces of the side-wall sections $h^5$, and suitable springs $I'$ hold the stops or catches I in their normal position.

As the box H is moved laterally toward one side of the vehicle, as presently described, the rounding faces $i^3$ of the inner ends of the stops or catches I on the corresponding side of the box engage the upper face of the adjacent side bar $g$, and said stops or catches are rocked on their pivots until their shoulders $i'$ are forced from operative position, as clearly indicated at Fig. 5, whereupon the corresponding side-wall section $h^5$ is free to swing on its hinges. The box H is then rocked or tilted, as presently described, and as illustrated at Fig. 4, so that the side provided with the unlocked side-wall section $h^5$ is beneath the other side, and said section $h^5$ is automatically forced outward by the load within the box and permits of the ready and automatic escape of said load. The box H is then returned to its normal position, and the lower edge of the side-wall section $h^5$ is forced against the rounding faces $i^2$ of the stops or catches I, and said stops are automatically rocked against the action of the corresponding springs I' until the section $h^5$ assumes its normal position, whereupon the stop-shoulders $i'$ automatically engage and lock the side-wall section $h^3$ in said position.

To one skilled in the art it will be readily understood that the upper sections or bars $h^4$ of the side walls of the vehicle-box may be dispensed with, and that the opposite ends of the upper edge of the movable section $h^5$ may be provided with trunnions journaled in the end walls $h'\ h'$. It is, however, unnecessary to illustrate or further describe this slight modification of my invention.

J is a shaft extending lengthwise of the frame G, and having its central portion and its opposite ends journaled in the cross-bars $g'\ g'\ g'$, and its opposite ends each provided with a pair of drums or wheels $j\ j'$, arranged within the adjacent endmost cross-bars $g'$.

K K are guide-pulleys or wheels journaled in the opposite ends of the inner faces of the endmost cross-bars $g'\ g'$ and brackets $k$, secured thereto, and L L are flexible connections, as ropes, chains, &c., having corresponding or inner ends secured to the drums or wheels J, their bodies passed over the pulleys or wheels K and led across the frame, and their opposite ends secured to the opposite sides of the corresponding ends of the box H.

The bottom $h$ of the box H rests upon the rollers $g^3$, so as to facilitate the lateral movement of said box, and the shaft J is provided at its front end with a crank J' and a hand-piece $J^2$. Consequently, as the shaft J is turned in either direction, the box is moved laterally toward the opposite side of the vehicle until one side thereof projects considerably beyond the corresponding side of the frame G. As the box reaches the limit of its outward movement the curved faces $i^3$ of the stops or catches I stand over the corresponding frame side bar $g$, and when the projecting edge of the box begins to descend these catches release the movable side-wall section of the projecting side of the box. The weight of the load causes the box H to rock or tilt automatically to its position. (Indicated by full and dotted lines at Fig. 4.)

Suitable stops, as flexible chains M, having their inner ends secured to loops or eyes $m$ at the opposite extremities of the endmost cross-bars $g'\ g'$ and their opposite ends secured to corresponding loops or eyes $m'$ at the opposite ends of the box H, limit the rocking or tilting movement of the box, as clearly illustrated at Fig. 4. By employing two of these chains, as shown in Fig. 2, one at each side of the vehicle, (and there is preferably another pair at the other end thereof,) when the box is dumped, as illustrated in Fig. 4, one chain prevents the inner edge of the box from rising too high, while the other chain prevents the outer edge of the box from moving so far off the frame G as to pass beyond the center of gravity. After the load is discharged from the box H the rotation of the shaft J is reversed and the box is readily drawn to its normal position, and suitable stops N then operate to hold the box in said position. The stops N preferably consist of hooks linked at their lower ends to eyes $n$ upon the endmost cross-bars $g'$, and having their opposite hooked ends engaged with eyes $n'$ upon the ends of the box H. Endwise movement of the box H is prevented by suitable guides or projections O, secured to the central portions of the endmost cross-bars $g'\ g'$ of the frame G and engaged with the inner sides of the depending portions of the endmost cross-bars $H'\ H'$ of the box H.

My improved vehicle, as will be readily understood from the foregoing description and upon reference to the drawings, readily and quickly discharges an entire load of stone or other similar articles at either side thereof. Its box is easily returned to its normal position, and is firmly held either in its position assumed when discharging a load or in its normal position. Moreover, the parts of my improved vehicle are few and strong, and it is durable and practical in use and reduces to a minimum the amount of labor, time, and inconvenience heretofore necessitated in handling stone and similar articles and unloading a vehicle laden therewith.

It will be evident that considerable change may be made in the detail construction and arrangement of the parts of my improved vehicle without departing from the spirit of my invention. Hence I do not herein specifically limit myself to such exact detail construction and arrangement.

Having thus fully described my invention, what I claim as new, and desire to secure by Letters Patent, is—

1. In a dumping vehicle, the combination with the running gear consisting of wheels, axles, bolsters, and a frame having side bars and cross bars, the latter being provided with sockets in their upper faces, and supporting rollers journaled in said sockets; of a box consisting of a bottom having rigid end walls connected by side walls whose upper sections are stationary and whose lower sections are hinged beneath the upper sections, catches pivoted between their ends to ears depending from the bottom and having shoulders at their outer ends normally engaging the lower edges of said lower sections and provided with rounded outer faces, springs holding these shoulders normally raised, the inner ends of the catches having downwardly rounding faces standing normally inside and below the plane of the side bars of said frame, and means substantially as described for moving said box laterally in either direction over the rollers on the frame, as and for the purpose set forth.

2. In a dumping vehicle, the combination with the running gear consisting of wheels, axles, bolsters, and a frame having side bars and cross bars, the latter being provided with sockets in their upper faces, and supporting rollers journaled in said sockets; of a box consisting of a bottom, rigid end walls rising above and depending slightly below said bottom, and swinging side walls, catches pivoted between their ends to ears depending from the bottom and having shoulders at their outer ends normally engaging the lower edges of said swinging walls and provided with rounded outer faces, the inner ends of the catches having downwardly rounding faces standing normally inside and below the plane of the side bars of said frame, guides rising from the centers of the endmost cross-bars of the frame and standing just inside the depending portions of the end bars of the box, a shaft journaled longitudinally in said frame and having a pair of drums near each end and a crank on one extremity, guide pulleys mounted at opposite ends of the inner faces of the endmost cross bars of the frame, flexible connections leading from each drum outward over a guide-pulley and then across beneath the box and secured to the opposite edge thereof, and means substantially as described for tripping said catches, limiting the dumping movement of the box, and holding the latter in normal position, all as and for the purpose set forth.

3. In a dumping vehicle, the combination with the running gear consisting of wheels, axles, bolsters, and a frame having side bars and cross bars, the latter being provided with sockets in their upper faces, and supporting rollers journaled in said sockets; of a box consisting of a bottom, rigid end walls rising above and depending slightly below said bottom, and swinging side walls, catches for holding the latter normally in closed position, guides rising from the centers of the endmost cross bars of the frame and standing just inside the depending portions of the end bars of the box, a shaft journaled longitudinally in said frame and having a pair of drums near each end and a crank on one extremity, guide pulleys mounted at opposite ends of the inner faces of the endmost cross bars of the frame, flexible connections leading from each drum outward over a guide pulley and then across beneath the box and secured to the opposite edge thereof, chains connected at their extremities to the ends of the endmost crossbars of the frame and of the box, and a hook linked to the center of one cross bar of the frame and detachably engaging an eye in one cross bar of the box, all as and for the purpose set forth.

In testimony whereof I have hereunto signed my name, in the presence of two attesting witnesses, at Syracuse, in the county of Onondaga, in the State of New York, this 8th day of May, 1893.

GEORGE W. PELLET, JR.

Witnesses:
 CLARK H. NORTON,
 KATHERINE H. THEOBALD.